US012668099B2

(12) United States Patent
Rhee et al.

(10) Patent No.: US 12,668,099 B2
(45) Date of Patent: Jun. 30, 2026

(54) INTEGRATED COOLING MODULE

(71) Applicant: Hanon Systems, Daejeon (KR)

(72) Inventors: Sangyong Rhee, Daejeon (KR);
In-Guk Hwang, Daejeon (KR);
Hae-Jun Lee, Daejeon (KR); **Sang Ok
Lee**, Daejeon (KR)

(73) Assignee: HANON SYSTEMS, Daejeon (KR)

( * ) Notice: Subject to any disclaimer, the term of this
patent is extended or adjusted under 35
U.S.C. 154(b) by 31 days.

(21) Appl. No.: 18/283,832

(22) PCT Filed: Jul. 13, 2022

(86) PCT No.: PCT/KR2022/010220
§ 371 (c)(1),
(2) Date: Sep. 25, 2023

(87) PCT Pub. No.: WO2023/287200
PCT Pub. Date: Jan. 19, 2023

(65) Prior Publication Data
US 2024/0166019 A1 May 23, 2024

(30) Foreign Application Priority Data

Jul. 14, 2021 (KR) ........................ 10-2021-0091973

(51) Int. Cl.
B60H 1/00 (2006.01)
B60H 1/32 (2006.01)
(Continued)

(52) U.S. Cl.
CPC ....... B60H 1/00885 (2013.01); B60H 1/3227
(2013.01); B60H 1/32284 (2019.05);
(Continued)

(58) Field of Classification Search
CPC .............. B60H 1/00885; B60H 1/3227; B60H
1/32284; B60H 1/3229; B60H 1/323;
(Continued)

(56) References Cited

U.S. PATENT DOCUMENTS 2,505,790 A * 5/1950 Panthofer ................ F01P 11/08
165/149
3,111,813 A * 11/1963 Blumentritt ............. F25B 21/02
136/204
(Continued)

FOREIGN PATENT DOCUMENTS

CN 111256392 A * 6/2020 ............. F25B 39/00
DE 102013201109 A1 * 7/2014 .......... H01M 10/663
(Continued)

OTHER PUBLICATIONS

International Search Report issued in PCT/KR2022/010220 on Oct.
17, 2022.

*Primary Examiner* — Ljiljana V. Ciric
(74) *Attorney, Agent, or Firm* — NORTON ROSE
FULBRIGHT US LLP

(57) ABSTRACT

An integrated cooling module includes a manifold, and
components mounted on the manifold. The manifold
includes a coolant storage part. Refrigerant channels are
included around the coolant storage part to allow refrigerant
to flow. The manifold has one or more first connection ports
configured to allow the coolant storage part to communicate
with the outside, and one or more second connection ports
configured to allow the refrigerant channel to communicate
with the outside.

16 Claims, 9 Drawing Sheets

(51) Int. Cl.

| | | |
|---|---|---|
| *B60K 1/00* | (2006.01) | |
| *B60K 11/02* | (2006.01) | |
| *F01P 3/12* | (2006.01) | |
| *F01P 3/18* | (2006.01) | |
| *F01P 3/20* | (2006.01) | |
| *F01P 5/10* | (2006.01) | |
| *F01P 7/14* | (2006.01) | |
| *F01P 11/02* | (2006.01) | |
| *F01P 11/04* | (2006.01) | |

(52) U.S. Cl.
CPC .......... *B60H 1/3229* (2013.01); *B60H 1/323* (2013.01); *B60K 11/02* (2013.01); *F01P 3/12* (2013.01); *F01P 3/20* (2013.01); *F01P 11/029* (2013.01); *B60K 1/00* (2013.01); *B60K 2001/003* (2013.01); *B60K 2001/005* (2013.01); *B60K 2001/006* (2013.01); *F01P 3/18* (2013.01); *F01P 5/10* (2013.01); *F01P 2007/146* (2013.01); *F01P 11/04* (2013.01); *F01P 2025/08* (2013.01); *F01P 2060/14* (2013.01); *F01P 2060/18* (2013.01)

(58) Field of Classification Search
CPC .... B60K 11/02; B60K 1/00; B60K 2001/003; B60K 2001/005; B60K 2001/006; F01P 3/12; F01P 3/20; F01P 11/029; F01P 3/18; F01P 5/10; F01P 11/04; F01P 2007/146; F01P 2025/08; F01P 2060/14; F01P 2060/18
USPC ........................................................ 165/140
See application file for complete search history.

(56) References Cited

U.S. PATENT DOCUMENTS

| | | | | | |
|---|---|---|---|---|---|
| 3,481,393 | A | * | 12/1969 | Chu ........................ | H01L 25/03 165/104.31 |
| 3,675,710 | A | * | 7/1972 | Ristow ..................... | F28B 9/08 165/111 |
| 3,889,879 | A | * | 6/1975 | Wellman ................ | B60K 11/02 123/41.31 |
| 3,989,103 | A | * | 11/1976 | Cieszko ................ | F28F 9/0231 165/110 |
| 4,109,707 | A | * | 8/1978 | Wilson ................ | H01L 23/4006 165/DIG. 48 |

| | | | | | |
|---|---|---|---|---|---|
| 5,141,048 | A | * | 8/1992 | Sausner ................... | F28B 9/08 165/110 |
| 5,653,111 | A | * | 8/1997 | Attey ................. | F04D 13/0673 165/170 |
| 5,752,566 | A | * | 5/1998 | Liu ......................... | F25B 39/04 165/110 |
| 5,822,993 | A | * | 10/1998 | Attey ..................... | H10N 10/13 62/3.2 |
| 5,988,267 | A | * | 11/1999 | Park ................... | F28D 1/05375 165/110 |
| 6,341,648 | B1 | * | 1/2002 | Fukuoka .............. | B21C 37/151 237/12.3 B |
| 6,619,044 | B2 | * | 9/2003 | Batchelor .............. | F28F 1/045 62/3.2 |
| 6,769,269 | B2 | * | 8/2004 | Oh ......................... | F25B 39/04 62/509 |
| 6,807,811 | B2 | * | 10/2004 | Lee ....................... | F24F 12/002 62/3.7 |
| 8,689,742 | B2 | * | 4/2014 | Myers ..................... | F01P 11/08 123/41.31 |
| 9,494,368 | B2 | * | 11/2016 | Jindou ...................... | F28F 9/02 |
| 9,651,317 | B2 | * | 5/2017 | Jindou ................. | F28F 9/0275 |
| 9,920,686 | B2 | * | 3/2018 | Somhorst ........... | F02B 29/0412 |
| 10,151,522 | B2 | * | 12/2018 | Junge ................. | F25B 5/00 |
| 10,619,530 | B2 | * | 4/2020 | Dries ................. | F16H 57/0475 |
| 10,780,849 | B1 | * | 9/2020 | Garcia .............. | B60R 16/0231 |
| 10,900,557 | B2 | * | 1/2021 | Muhammad ........... | F28D 9/005 |
| 10,934,911 | B2 | * | 3/2021 | Byrd ....................... | F01P 5/10 |
| 10,944,117 | B2 | * | 3/2021 | Imamura ............. | H01M 8/0267 |
| 10,989,479 | B2 | * | 4/2021 | Dziubinschi ....... | B60H 1/00335 |
| 11,811,296 | B2 | * | 11/2023 | Long ........................ | B60K 1/00 |
| 12,151,539 | B2 | * | 11/2024 | Calderone ........... | B60H 1/3223 |
| 2012/0168138 | A1 | * | 7/2012 | Myers .................... | F28F 27/02 165/200 |
| 2020/0269723 | A1 | | 8/2020 | Park et al. | |
| 2024/0166019 | A1 | * | 5/2024 | Rhee .................... | B60H 1/3229 |
| 2024/0167769 | A1 | * | 5/2024 | Rhee ...................... | B60K 11/02 |
| 2025/0211062 | A1 | * | 6/2025 | Carlson ................. | H02K 11/33 |

FOREIGN PATENT DOCUMENTS

| | | | | | | |
|---|---|---|---|---|---|---|
| DE | 102014105097 | A1 | * | 10/2015 | ........... | F16K 27/003 |
| EP | 2177722 | B1 | * | 1/2012 | .............. | F01P 11/08 |
| EP | 1952470 | B1 | * | 3/2012 | .............. | H01M 8/04 |
| KR | 101112466 | B1 | | 2/2012 | | |
| KR | 20160144646 | A | | 12/2016 | | |
| KR | 20170115326 | A | | 10/2017 | | |
| KR | 20190068125 | A | | 6/2019 | | |
| KR | 102189058 | B1 | | 12/2020 | | |

* cited by examiner

10

200
(PT Sensor)

200
(EXV 2)

200
(Chiller 2)

200
(COND)

100

200
(EWP 1)

200
(EWP 2)

200
(Chiller 1)

INTEGRATED COOLING MODULE

CROSS REFERENCE TO RELATED APPLICATIONS

This patent application is a national phase under 35 U.S.C. § 371 of International Patent Application No. PCT/KR2022/010220 filed Jul. 13, 2022, which claims the benefit of priority from Korean Patent Application No. 10-2021-0091973 filed Jul. 14, 2021, each of which is hereby incorporated herein by reference in its entirety for all purposes.

TECHNICAL FIELD

The present invention relates to an integrated cooling module applied to a vehicle cooling system, and more particularly, to an integrated cooling module in which components are integrated with a manifold to eliminate a hose or pipe and reduce a size and weight of the entire cooling system, and the manifold is elongated in a gravitational direction to advantageously store a coolant therein and intensively mount the components, and an internal heat exchanger is provided in the manifold to maximize spatial efficiency.

BACKGROUND ART

Recently, as there is gradually increasing interest in energy efficiency and problems of environmental pollution, there is a need for development of environmental-friendly vehicles that can substantially replace internal combustion engine vehicles. The environmental-friendly vehicles are typically classified into an electric vehicle which operates by using fuel cells or electricity as a power source, and a hybrid vehicle that operates by using an engine and a battery.

Unlike an air conditioning device for a general vehicle, a separate heater is not used for an electric vehicle or a hybrid vehicle among the environmental-friendly vehicles. The air conditioning system applied to the environmental-friendly vehicle typically refers to a heat pump system.

Meanwhile, the electric vehicle generates driving power by converting energy, which is generated by a chemical reaction between oxygen and hydrogen, into electrical energy. In this process, because thermal energy is generated by a chemical reaction in a fuel cell, it is essential to effectively remove generated heat to ensure performance of the fuel cell.

Further, the hybrid vehicle also generates driving power by operating an engine that uses general fuel to operate and operating a motor by using electric power supplied from the fuel cell or an electric battery. Therefore, to ensure performance of the motor, it is necessary to effectively remove heat generated from the fuel cell or battery and the motor.

Therefore, in the hybrid vehicle or the electric vehicle in the related art, a battery cooling system needs to be configured as a separate closed circuit, together with a cooling system and a heat pump system, in order to prevent heat generation by the motor, the electrical components, the fuel cell, and the battery.

For this reason, there are problems in that a size and weight of a cooling module disposed at a front side of a vehicle are increased, and layouts of connection pipes for supplying a refrigerant or coolant to a heat pump system, a cooling means, and a battery cooling system in an engine room are complicated.

DOCUMENT OF RELATED ART

Korean Patent Application Laid-Open No. 2019-0068125 (Jun. 18, 2019)

DISCLOSURE

Technical Problem

The present invention has been made in an effort to solve the above-mentioned problem, and an object of the present invention is to provide an integrated cooling module in which components are integrated with a manifold to eliminate a hose or pipe and reduce a size and weight of the entire cooling system, the manifold is elongated in a gravitational direction to advantageous store a coolant therein and intensively mount the components, and an internal heat exchanger is provided in the manifold to maximize spatial efficiency.

Technical Solution

An integrated cooling module according to an example of the present invention includes: a manifold; and components mounted on the manifold, in which the manifold includes a coolant storage part in which a coolant is stored and flows, and in which refrigerant channels, through which a refrigerant flows, are provided around the coolant storage part.

The manifold may have a structure in which a first manifold, a second manifold, and a third manifold are stacked and coupled to one another, the second manifold may be hollowed therein, the coolant storage part may be positioned in the hollowed interior of the second manifold, and the first manifold and the third manifold may cover and close the hollowed interior of the second manifold.

A first gasket may be provided between the first and second manifolds to seal a portion between the first and second manifolds, and a second gasket may be provided between the second and third manifolds to seal a portion between the second and third manifolds.

The refrigerant channel may be formed inside a housing that constitutes the second manifold.

The refrigerant channel may be further formed inside at least one of a housing, which constitutes the first manifold, and a housing that constitutes the second manifold.

The first manifold may have a coolant inlet port formed through the first manifold so that the coolant is introduced into the coolant storage part, and a coolant inlet port closure may be provided in the coolant inlet port and configured to close the coolant inlet port.

The third manifold may have one or more support legs extending from one side to the other side and each having one side coupled to the third manifold.

The internal heat exchanger IHX may be provided in the manifold and disposed in the coolant storage part.

The manifold may have first mounting ports configured to allow the coolant storage part and the components to communicate with one another, and second mounting ports configured to allow the refrigerant channels and the components to communicate with one another.

At least one of the components may be fluidly connected to the first mounting port and the second mounting port and configured such that the coolant and the refrigerant flow therein.

The components may include a condenser, a chiller, a PT sensor, an expansion valve, and a water pump.

The water pump may be fluidly connected to the coolant storage part through the first mounting port, the condenser, the PT sensor, and the expansion valve may be respectively fluidly connected to the refrigerant channels through the second mounting ports, and the chiller may be fluidly connected to the coolant storage part and the refrigerant channel through the first mounting port and the second mounting port.

Two chillers and two water pumps may be mounted on the manifold.

The components may include a water pump, and the manifold may have a water pump mounting structure provided in the form of a groove that accommodates an end side of the water pump that is coupled to the manifold.

The manifold may have one or more first connection ports configured to allow the coolant storage part to communicate with the outside, and one or more second connection ports configured to allow the refrigerant channel to communicate with the outside.

The manifold may be elongated in a gravitational direction.

The components may include a condenser and a chiller, and the condenser and the chiller may be disposed so that length directions of the condenser and the chiller are parallel to a gravitational direction.

Advantageous Effects

According to the present invention, the components are integrated with the manifold to eliminate a hose or pipe, thereby achieving miniaturization and weight reduction of the entire cooling system. Further, the mounting structures for mounting the components in the vehicle may be eliminated, which may reduce the number of components and the number of assembling processes at the time of configuring the cooling system.

In addition, the manifold is elongated in the gravitational direction to advantageously store the coolant therein and intensively mount the components, and the internal heat exchanger is provided in the manifold to maximize spatial efficiency.

MODE FOR INVENTION

Hereinafter, the present invention will be described with reference to the accompanying drawings.

Figure 1:
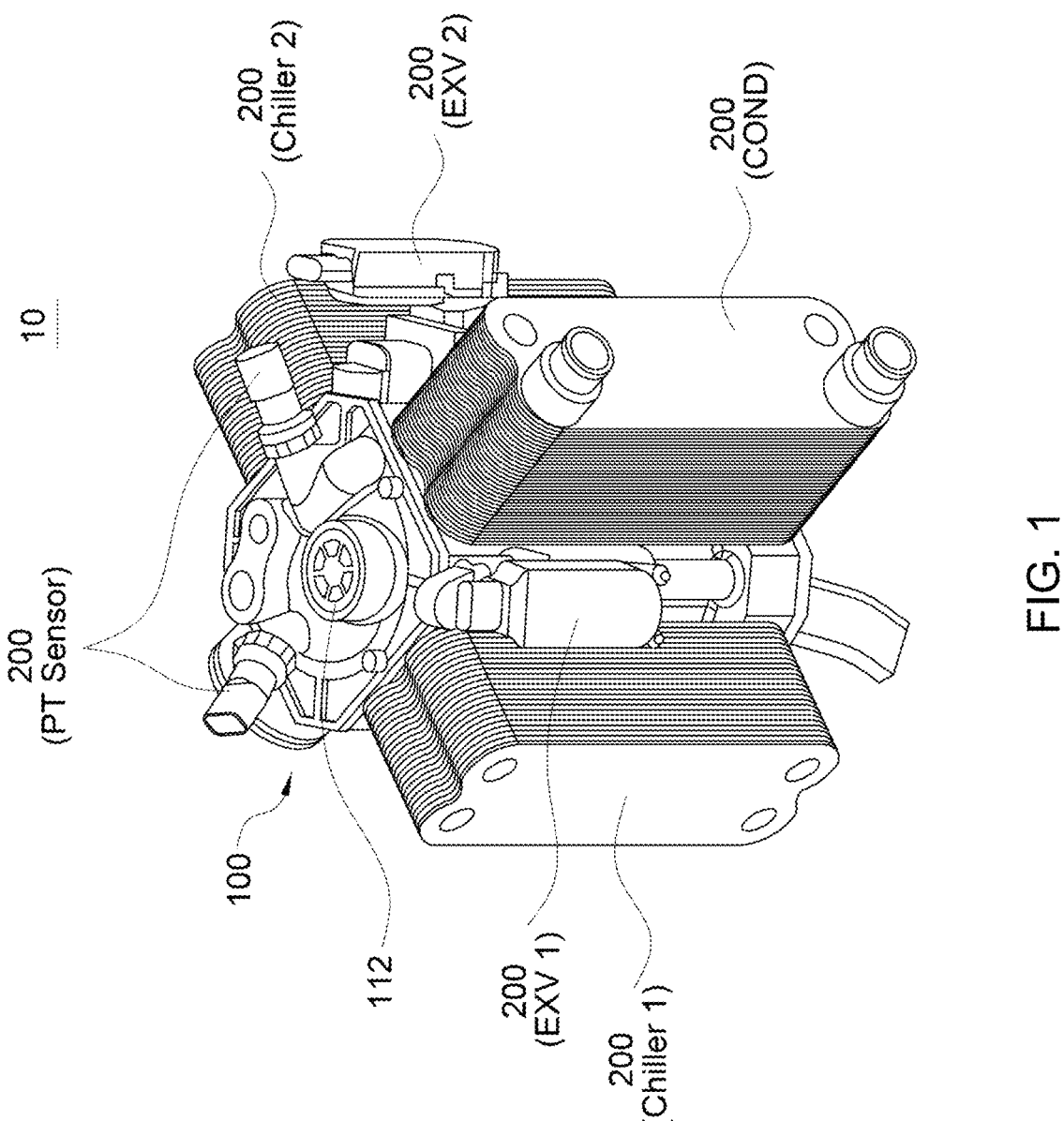
FIG. 1 is a perspective view illustrating a cooling module according to an example of the present invention when viewed from the top of the front side.
Figure 2:
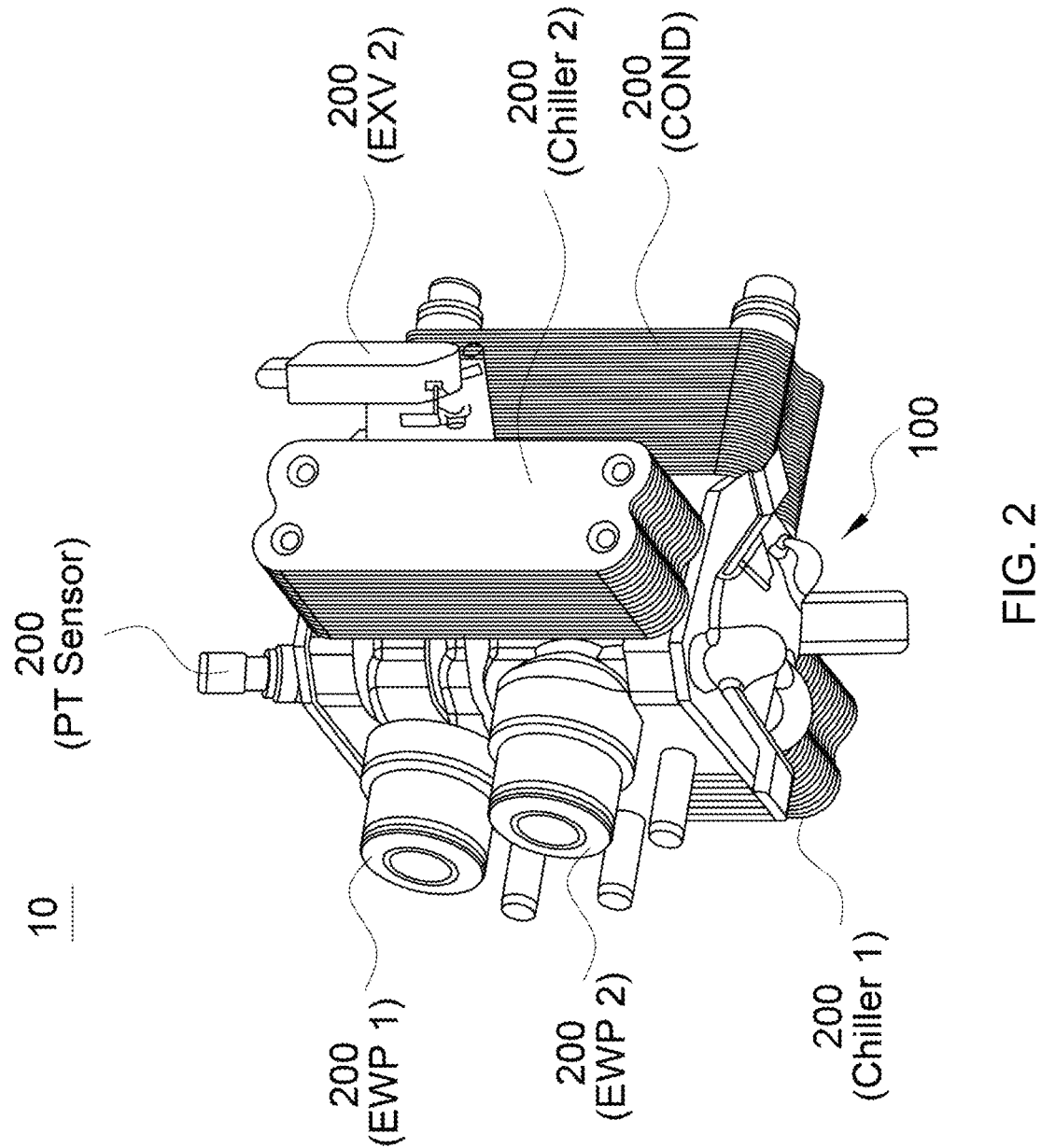
FIG. 2 is a perspective view illustrating the integrated cooling module in FIG. 1 when viewed from the bottom of the rear side.

FIG. 1 is a perspective view illustrating an integrated cooling module according to an example of the present invention when viewed from the top of the front side, and FIG. 2 is a perspective view illustrating the integrated cooling module in FIG. 1 when viewed from the bottom of the rear side. As illustrated, an integrated cooling module 10 of the present invention broadly includes a manifold 100, a plurality of components 200 mounted on the manifold.

In the present invention, the components 200 are integrated with the manifold 100. The manifold 100 may provide a mounting space in which the plurality of components 200 may be mounted. The manifold 100 has refrigerant channels in which a refrigerant may flow. The manifold 100 may have a coolant storage part in which a coolant may be stored and flow.

The component 200 are constituent elements of a vehicle cooling system. In the present invention, the components may be any one or more components selected from a condenser COND, a chiller, a PT sensor, an expansion valve EXV, and a water pump EWP. As described below, an internal heat exchanger IHX may be provided in the manifold 100.

The condenser (COND) is a heat exchanger configured to condense a gaseous refrigerant into a liquid refrigerant. The chiller is a heat exchanger configured to remove heat from the liquid refrigerant. The PT sensor (pressure/temperature sensor) is a sensor configured to measure pressure and temperature of the refrigerant. The expansion valve (EXV) is a valve configured to vaporize the liquid refrigerant by lowering the pressure of the liquid refrigerant. The water pump (electric water pump (EWP)) is an electronic pump configured to pressurize and transfer the coolant. The internal heat exchanger IHX is a heat exchanger configured to allow a high-temperature liquid refrigerant and a low-temperature gaseous refrigerant to exchange heat with each other.

The components 200 are mounted on the manifold 100 and constitute the integrated cooling module 10. In this case, the components 200 may be mounted to communicate with at least any one of the coolant storage part and the refrigerant channels provided in the manifold 100. More specifically, the components 200 are mounted to communicate with mounting ports that correspond to the components among refrigerant channel mounting ports, which are formed in the manifold 100 and communicate with the refrigerant channels, and coolant storage part mounting ports that are formed in the manifold 100 and communicate with the coolant storage part. Therefore, the components 200 may communicate with at least one of the refrigerant channels and the coolant storage part.

Figure 3:
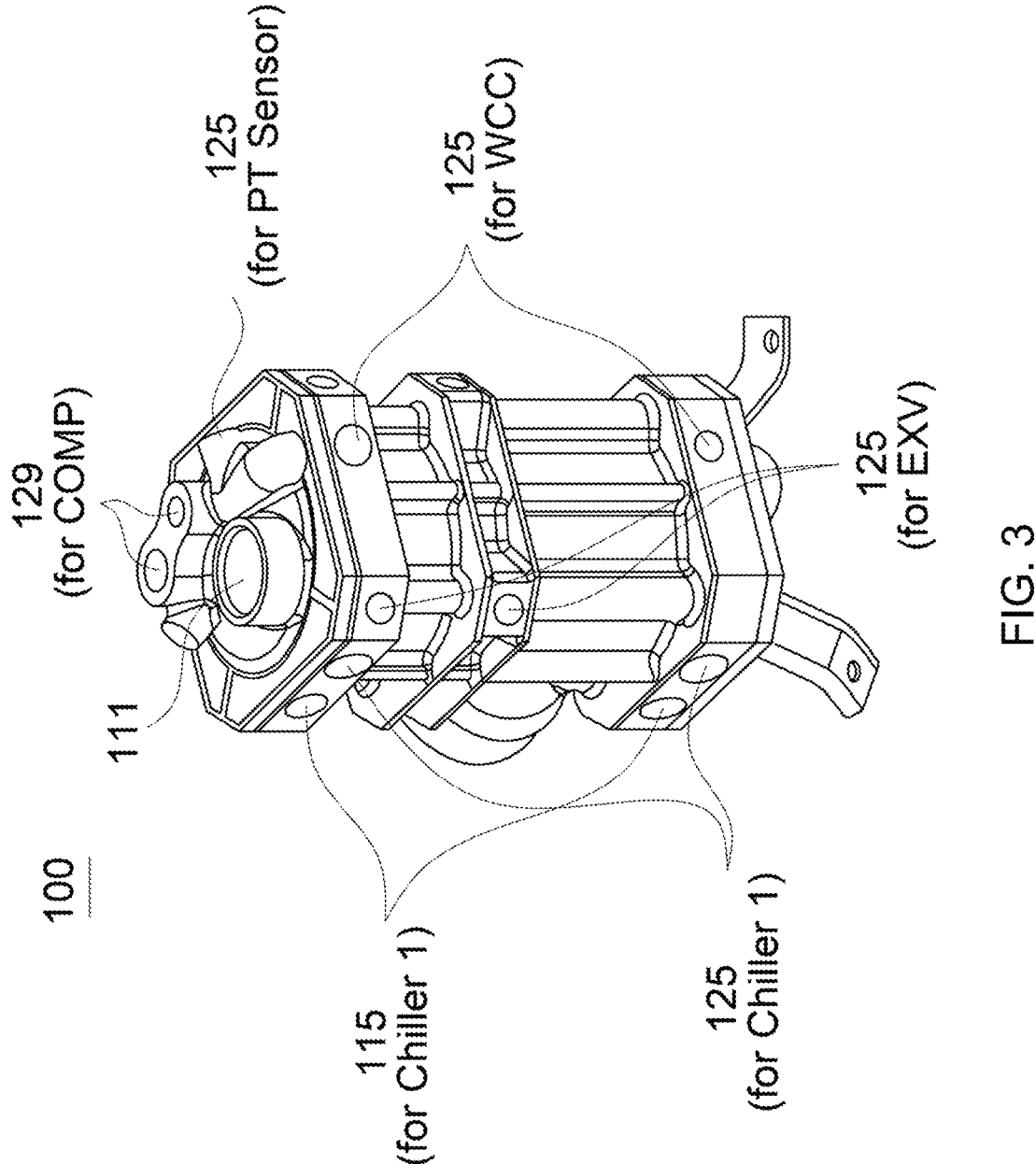
FIG. 3 is a front perspective view of a manifold according to the example of the present invention.
Figure 4:
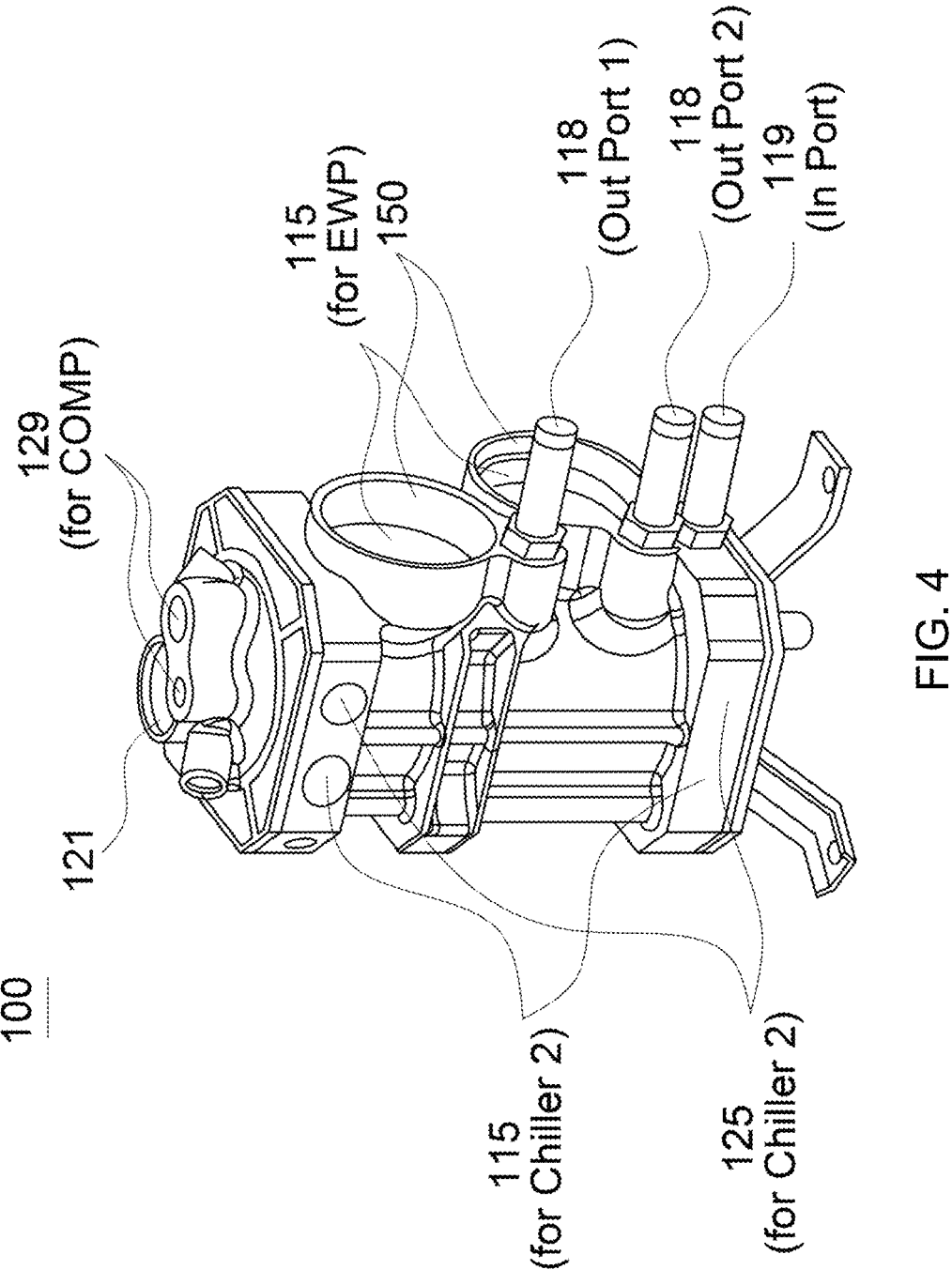
FIG. 4 is a rear perspective view of FIG. 3.
Figure 5:
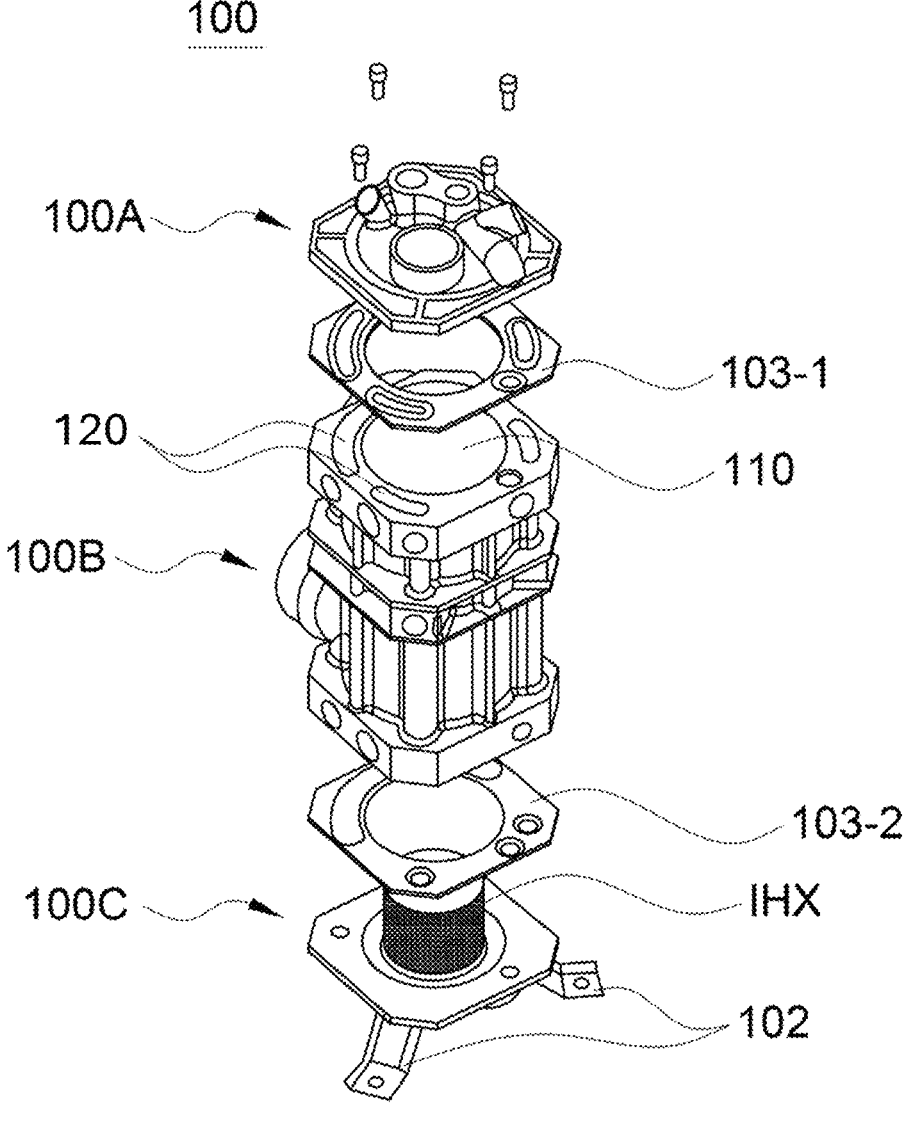
FIG. 5 is an exploded perspective view of FIG. 3.

Hereinafter, the manifold 100 of the present invention will be described first. FIG. 3 is a front perspective view of a manifold according to the example of the present invention, FIG. 4 is a rear perspective view of FIG. 3, and FIG. 5 is an exploded perspective view of FIG. 3.

As illustrated, the manifold 100 of the present invention may include a coolant storage part 110 in which the coolant may be stored and flow. The manifold 100 may have refrigerant channels 120 provided around the coolant storage part 110 so that the refrigerant may flow therethrough. That is, in the vehicle cooling system, the manifold 100 of the present invention serves to provide a space in which the components are intensively mounted at a point at which a primary loop, through which the refrigerant circulates, and a secondary loop, through which the coolant circulates, intersect each other. The manifold 100 serves to provide the refrigerant and the coolant to the component, which requires the heat exchange between the refrigerant and the coolant, and the manifold 100 serves as a reservoir for supplementing and storing the coolant and the refrigerant. The coolant storage part 110 and the refrigerant channel 120 of the manifold 100 may correspond to a part of the primary loop and a part of the secondary loop.

The coolant storage part 110 may be structured to be entirely hollowed in the manifold so that the coolant may be stored and flow in the hollowed interior. The refrigerant channel 120 may be structured to have a flow path formed inside the structure of the manifold 100 that surrounds the coolant storage part 110, such that the refrigerant may flow along the flow path. However, the structures of the coolant storage part 110 and the refrigerant channel 120 are provided for illustrative purposes only, and the present invention is not limited thereto. For example, the coolant storage part 110 may be provided in the form of a groove in a partial region in the manifold. The refrigerant channel 120 may be structured such that a separate structure, such as a tube or pipe, capable of defining a flow path is mounted on an outer peripheral surface or an inner peripheral surface of the manifold.

Meanwhile, the manifold 100 of the present invention may be elongated in a gravitational direction. For example, as illustrated in FIG. 3, the manifold 100 may have a long quadrangular column shape. A length of the manifold in a height direction, i.e., the gravitational direction, may be appropriately designed in consideration of the relationship between the components 200 mounted on the manifold 100, and particularly, designed to correspond to lengths of the condenser and the chiller. The manifold 100 may be entirely hollowed at a center of the inside of the quadrangular column-shaped structure, such that the coolant may be stored in the manifold 100. The manifold 100 may have the refrigerant channels formed in the structure, which constitutes the manifold 100, so that the refrigerant may flow in the manifold 100. In the present invention described above, the manifold may be elongated in the gravitational direction to advantageously store the coolant therein and more intensively mount the components, thereby greatly reducing a space occupied by the integrated cooling module in a limited space in an engine room.

With reference to FIG. 5, the manifold 100 of the present invention may include a first manifold 100A, a second manifold 100B, and a third manifold 100C. More specifically, the manifold 100 may have a structure in which the first, second, and third manifolds 100A, 100B, and 100C are stacked and coupled to one another in an upward/downward direction. Further, a first gasket 103-1 may be provided between the first manifold 100A and the second manifold 100B to seal a portion between the first and second manifolds, and a second gasket 103-2 may be provided between the second manifold 100B and the third manifold 100C to seal a portion between the second and third manifolds. In addition or alternatively, the first, second, and third manifolds 100A, 100B, and 100C may be stacked and coupled to one another by a method such as brazing, structural adhesive, mechanical fixation, or welding. Meanwhile, the first, second, and third manifolds 100A, 100B, and 100C may each be made of a material such as aluminum, thermoplastic, or stainless steel depending on a manufacturing method.

The second manifold 100B may be hollowed therein, and the coolant storage part 110 may be positioned in the hollowed interior. The first manifold 100A and the third manifold 100C may be respectively structured to cover and close one side and the other side of the hollowed interior of the second manifold 100B. That is, the manifold 100 may have a three-stage structure including the second manifold 100B corresponding to a body and having a long pipe shape, and the first and third manifolds 100A and 100C respectively disposed at upper and lower sides of the second manifold 100B to close the second manifold 100B. Therefore, the coolant storage part 110 capable of storing the coolant may be provided in the hollowed interior of the second manifold 100B.

Further, the refrigerant channels 120, in which the refrigerant may flow and circulate, may be formed independently of the coolant storage part 110 and provided in the structure, which constitutes the second manifold 100B, i.e., provided in a housing of the second manifold. The refrigerant channel 120 may be formed by hollowing the interior of the housing along a line to allow the refrigerant to flow between the components (e.g., between the condenser, the chiller, the expansion valve, and the PT sensor in the case of the present invention) that define the primary loop among the components mounted on the manifold. Therefore, the components, which define the primary loop, are connected fluidly.

Further, to improve spatial utilization of the manifold 100, the refrigerant channels 120, which are connected to the refrigerant channels 120 formed in the second manifold 100B, may be further formed in the first manifold 100A and the third manifold 100C as well as the second manifold 100B. That is, most of the refrigerant channels 120 of the entire manifold 100 are formed in the housing of the second manifold 100B, and the refrigerant channels 120 may extend from the refrigerant channels 120 and be formed in the housing of the first manifold 100A and the housing of the third manifold 100C. Therefore, the components 200 may be additionally mounted in the first manifold 100A and the third manifold 100C. For example, as illustrated in FIGS. 1 and 3, at least a part of the refrigerant channel is formed in the first manifold 100A, such that the PT sensor, which communicates with the corresponding refrigerant channel, may be mounted in the first manifold. As described below, connection ports 129 may be provided in the first manifold and allow the refrigerant channels 120 of the manifold 100 to communicate with the outside through the corresponding refrigerant channels.

In addition, the second manifold 100B may have a mounting structure 150 on which the water pump EWP may be mounted. With reference to FIG. 4, the mounting structure 150 may be provided in the form of a groove so as to accommodate an end side of the water pump that is coupled to the manifold. Because the water pump pressurizes the coolant, the water pump receives high pressure. The mounting structure is provided in the form of a groove as described above, such that the water pump may be securely mounted, which assists in withstanding the high pressure. Therefore, the sealability between the manifold and the water pump may be reinforced, thereby preventing a leak of the coolant.

A coolant inlet port 111 formed through the first manifold 100A may be formed in the first manifold 100A. Therefore, it is possible to supplement the coolant to the coolant storage part 110 by introducing the coolant to the coolant storage part 110. In addition, a coolant inlet port closure 112 may be provided in the coolant inlet port 111 and configured to close the coolant inlet port 111, such that the coolant storage part 110 may be kept closed at ordinary times.

One or more support legs 102 may be provided on the third manifold 100C. One side of the support leg 102 may be coupled to the third manifold 100C and have a structure extending from one side to the other side. As illustrated, three support legs 102 may be provided to support the manifold 100 with overall balance. A fastening hole may be formed at the other end of the support leg 102 and coupled to, by bolting, to a support surface on which the support leg 102 and the manifold 100 are seated. The support leg 102 may be manufactured simultaneously with the third manifold 100C and integrated with the third manifold. Alternatively, the support leg 102 may be manufactured separately from the third manifold 100C and coupled to the third manifold.

With reference to FIG. 5, in the present invention, the internal heat exchanger IHX may be provided in the manifold 100, i.e., in the coolant storage part 110. In particular, as illustrated, the internal heat exchanger IHX may be a plate-type internal heat exchanger P-IHX. The internal heat exchanger IHX is mounted and coupled onto an upper portion of the third manifold 100C, such that the internal heat exchanger IHX and the manifold 100 may be integrated. Because the internal heat exchanger IHX is provided in the coolant storage part 110, the refrigerant flowing in the internal heat exchanger IHX and the coolant existing around the internal heat exchanger IHX may exchange heat with each other. As described above, the coolant storage part may be provided in the manifold, and the internal heat exchanger may be provided in the coolant storage part, thereby maximizing spatial efficiency.

Hereinafter, a specific coupling relationship between the manifold 100 and the component 200 will be described more specifically.

As described above, the component 200 may be mounted to communicate with at least any one of the coolant storage part 110 and the refrigerant channel 120 formed in the manifold 100. To this end, the manifold 100 may have first mounting ports 115 configured to allow the coolant storage part 110 and the components 200 to communicate with one another, and second mounting ports 125 configured to allow the refrigerant channels 120 and the components 200 to communicate with one another. With reference back to FIGS. 3 and 4, the plurality of first mounting ports 115 and the plurality of second mounting ports 125 are formed in the manifold 100. Therefore, the components 200 may be fluidly connected to the coolant storage part 110 and the refrigerant channels 120.

In this case, one of the components 200 may be fluidly connected to the first mounting port 115 and the second mounting port 125 so that the coolant and the refrigerant may flow therein. More specifically, among the components, the chiller is connected to both the first mounting port 115 and the second mounting port 125 so that the refrigerant and the coolant flow therein, such that the refrigerant may be cooled by the coolant, or the coolant may be cooled by the refrigerant.

In addition, the water pump EWP may be fluidly connected to the coolant storage part 110 through the first mounting port 115, and the condenser COND, the PT sensor, and the expansion valve EXV may be respectively fluidly connected to the refrigerant channels 120 through the second mounting ports 125. To this end, the first mounting port 115 and the second mounting port 125 may be appropriately provided in the manifold 100.

Meanwhile, two chillers and two water pumps EWP may be mounted on the manifold 100 of the present invention. In other words, the integrated cooling module 10 of the present invention may be a heat exchange module including two chillers and two water pumps EWP. With reference back to FIGS. 1 and 2, the integrated cooling module 10 of the present invention may have a structure in which a first chiller (Chiller 1) is mounted on one side surface of the manifold, a second chiller (Chiller 2) is mounted on the other side surface opposite to the one side surface, and a first water pump (EWP 1) and a second water pump (EWP 2) are respectively on lateral surfaces between the first chiller (Chiller 1) and the second chiller (Chiller 2). In this case, the first and second chillers (Chiller 1 and Chiller 2) may respectively correspond to the first and second water pumps (EWP 1 and EWP 2). For example, as described below, the coolant, which has exchanged heat while circulating through the first chiller (Chiller 1), may be introduced into the first water pump (EWP 1) and discharged to the outside. The coolant, which has exchanged heat while circulating through the second chiller (Chiller 2), may be introduced into the second water pump (EWP 2) and discharged to the outside. To this end, the internal space of the coolant storage part 110 may be divided into two or more spaces by separation walls or the like.

Further, the manifold 100 of the present invention may have one or more first connection ports 119 that allow the coolant storage part 110 to communicate with the outside, and one or more second connection ports 129 that allow the refrigerant channel 120 to communicate with the outside. In this case, the term 'outside' may mean other heat exchange components in the entire cooling line of the vehicle cooling system, for example, an inside condenser, which is another heat exchange condenser, an evaporator, an outer heat exchanger OHX, a compressor, or the like in addition to the integrated cooling module of the present invention. The first and second connection ports 119 and 129 and the other external components may be fluidly connected to one another by means of a valve or pipe.

For example, as illustrated in FIG. 4, the manifold 100 of the present invention may be configured such that the second connection port 129 may be formed in the upper portion of the manifold 100 and connected to an external compressor COMP, and the first connection port 119 may be formed around the lateral surface of the manifold 100 on which the water pump EWP is mounted, thereby defining a closed circuit with the external secondary loop. More specifically, the two second connection ports 129 may be provided, any one of the two second connection ports 129 is used as a refrigerant inlet port through which the refrigerant may be introduced from the outside, and the other of the two second connection ports 129 is used as a refrigerant discharge port through which the refrigerant may be discharged to the outside. The single first connection port 119 may be provided and used as a coolant inlet port through which coolant is introduced from the outside. Further, the coolant in the coolant storage part 110 may be discharged to the outside via the water pump EWP through the coolant discharge port 118 having one side connected to the water pump EWP.

Figure 6:
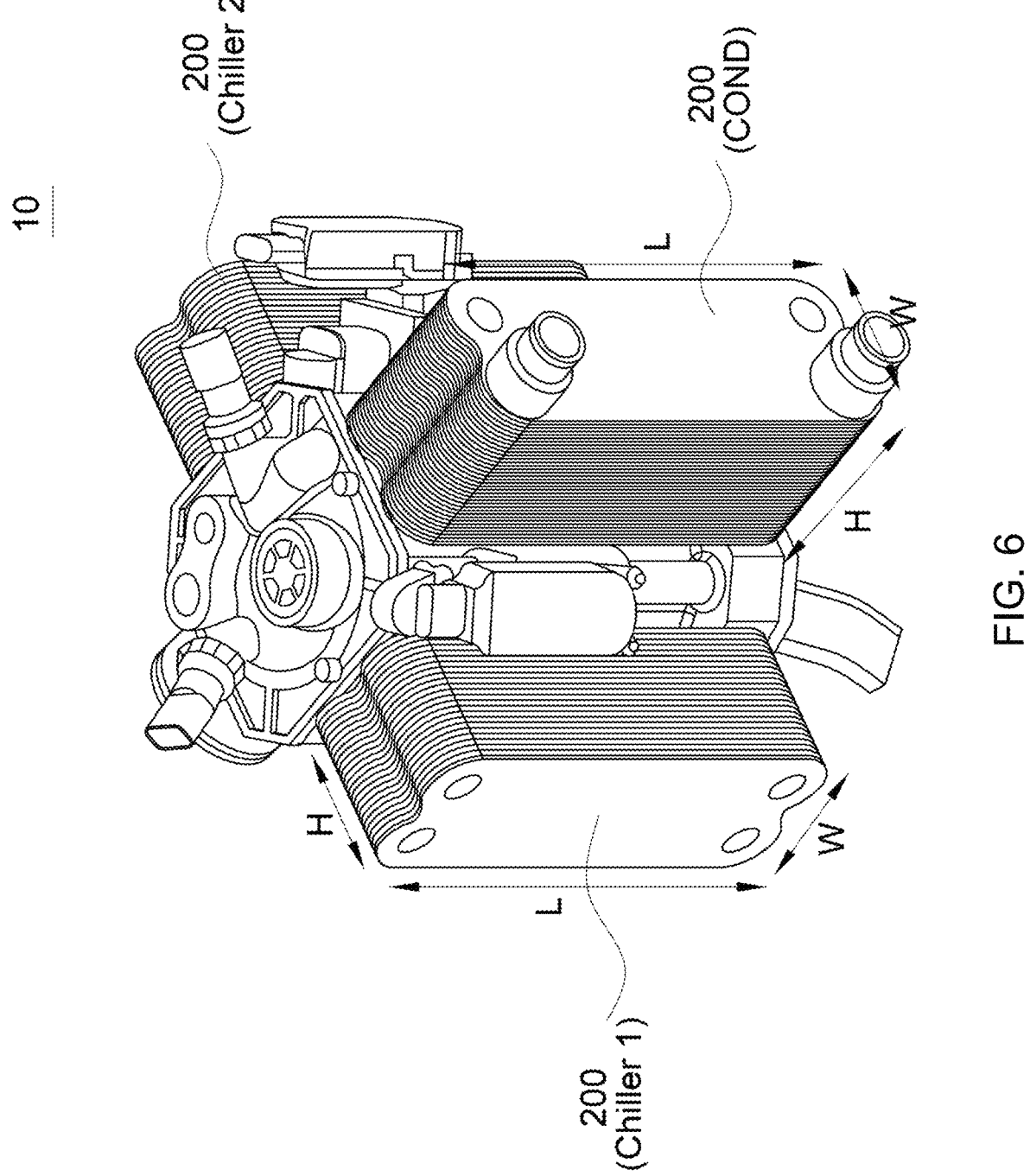
FIG. 6 is a view illustrating FIG. 1 again and illustrating length directions, width directions, and height directions of a condenser and a chiller.

Meanwhile, FIG. 6 is a view illustrating FIG. 1 again and illustrating length directions L, width directions W, and height directions H of the condenser COND and the chiller. As illustrated, in the integrated cooling module of the present invention, the condenser COND and the chiller may be disposed such that the length directions L of the condenser COND and the chiller are parallel to the gravitational direction. That is, the condenser COND and the chiller may be mounted on the manifold 100 so that the length direction L is perpendicular to the bottom surface, and the length direction L is parallel to the gravitational direction. Therefore, the condenser COND and the chiller may be disposed in parallel with each other. This is to widely disperse a load in the longitudinal direction of the condenser and the chiller in case that the condenser and the chiller are relatively heavy. Therefore, it is possible to maximally prevent damage to a sealing subsidiary material such as an O-Ring caused by degradation of a coupling/connecting portion with the manifold, i.e., an excessive eccentric load, bending stress, or the like. In addition, because a load is widely dispersed, it is possible to ensure stability and excellent NVH performance during a maintain process.

Figure 7:
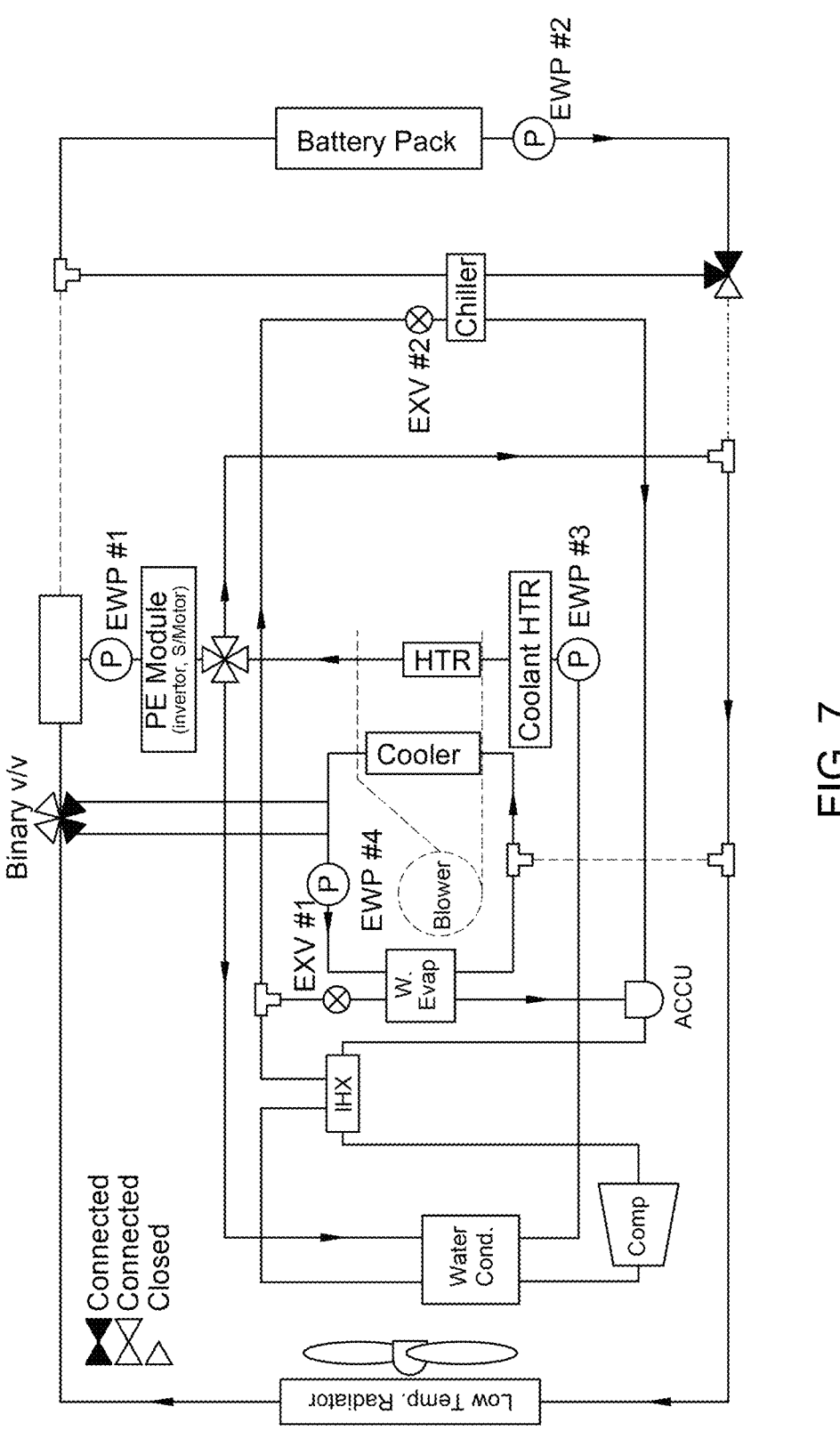
FIG. 7 is a view illustrating an example of a refrigerant circulation path and a coolant circulation path in a cooling system.

Hereinafter, a refrigerant circulation path and a coolant circulation path in the integrated cooling module will be described. FIG. 7 is a view illustrating an example of the refrigerant circulation path and the coolant circulation path in a cooling system, FIG. 8 is a view schematically illustrating the refrigerant circulation path according to the example of the present invention, and FIG. 9 is a view schematically illustrating the coolant circulation path according to the example of the present invention.

Figure 8:
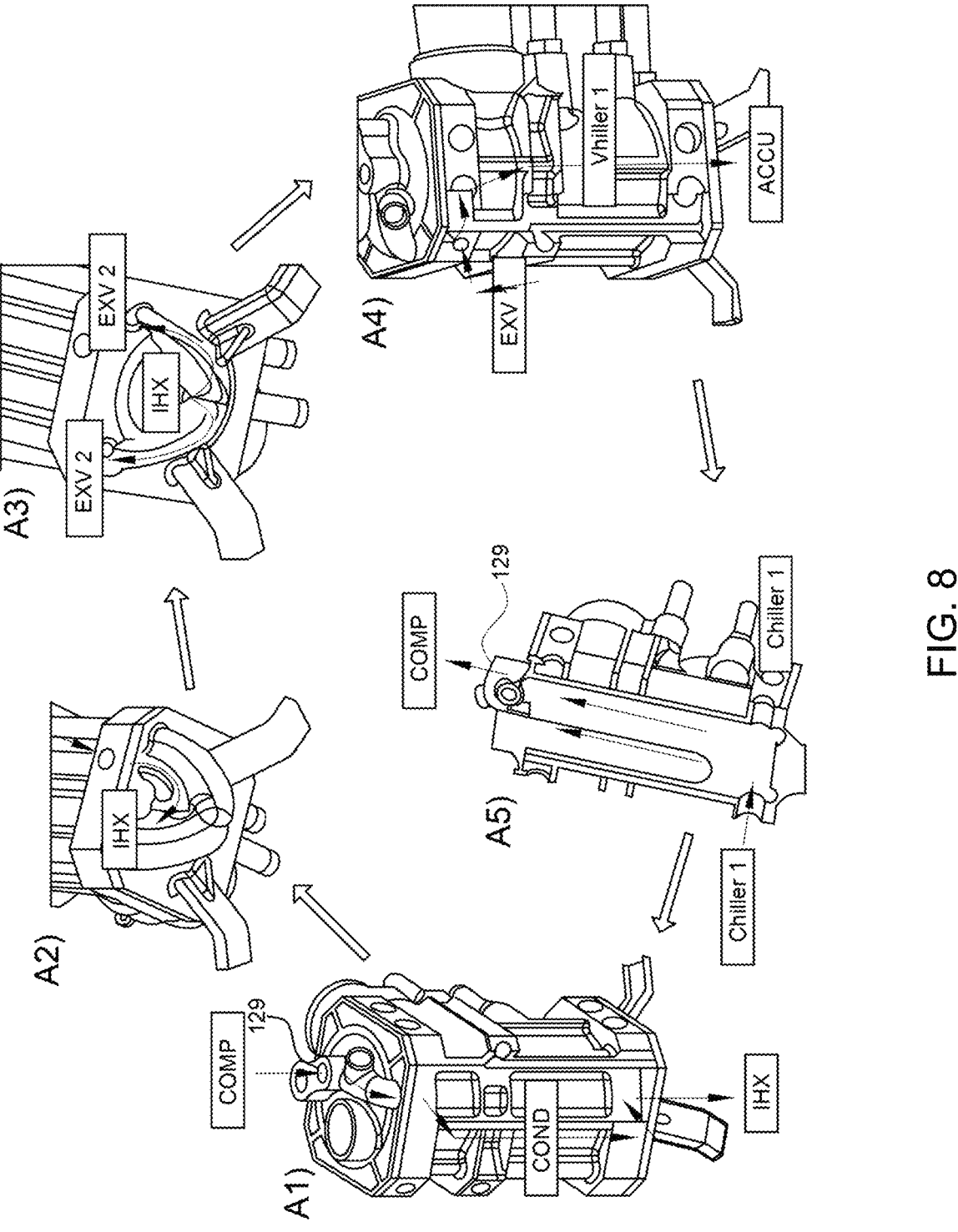
FIG. 8 is a view schematically illustrating the refrigerant circulation path according to the example of the present invention.

With reference to FIG. 8, the refrigerant is introduced into the refrigerant channel 120 through the second connection port 129 from the external compressor COMP and introduced into the condenser COND (A1). Thereafter, the refrigerant passes through the condenser COND and is introduced into the internal heat exchanger IHX in the manifold (A2). The refrigerant passes through the internal heat exchanger IHX and is distributed to the first and second expansion valves (EXV 1 and EXV 2) (A3). Thereafter, the refrigerant passes through the first and second expansion valves (EXV 1 and EXV E2) and is introduced into the first and second chillers (Chiller 1 and Chiller 2), and the refrigerant performs the heat exchange (A4). The refrigerant may move to the second connection port 129 along the refrigerant channel and be discharged to the condenser COND through the second connection port 129 (A5). In this case, the refrigerant having passed through the first and second chillers (Chiller 1 and Chiller 2) may further pass through an accumulator ACCU.

Figure 9:
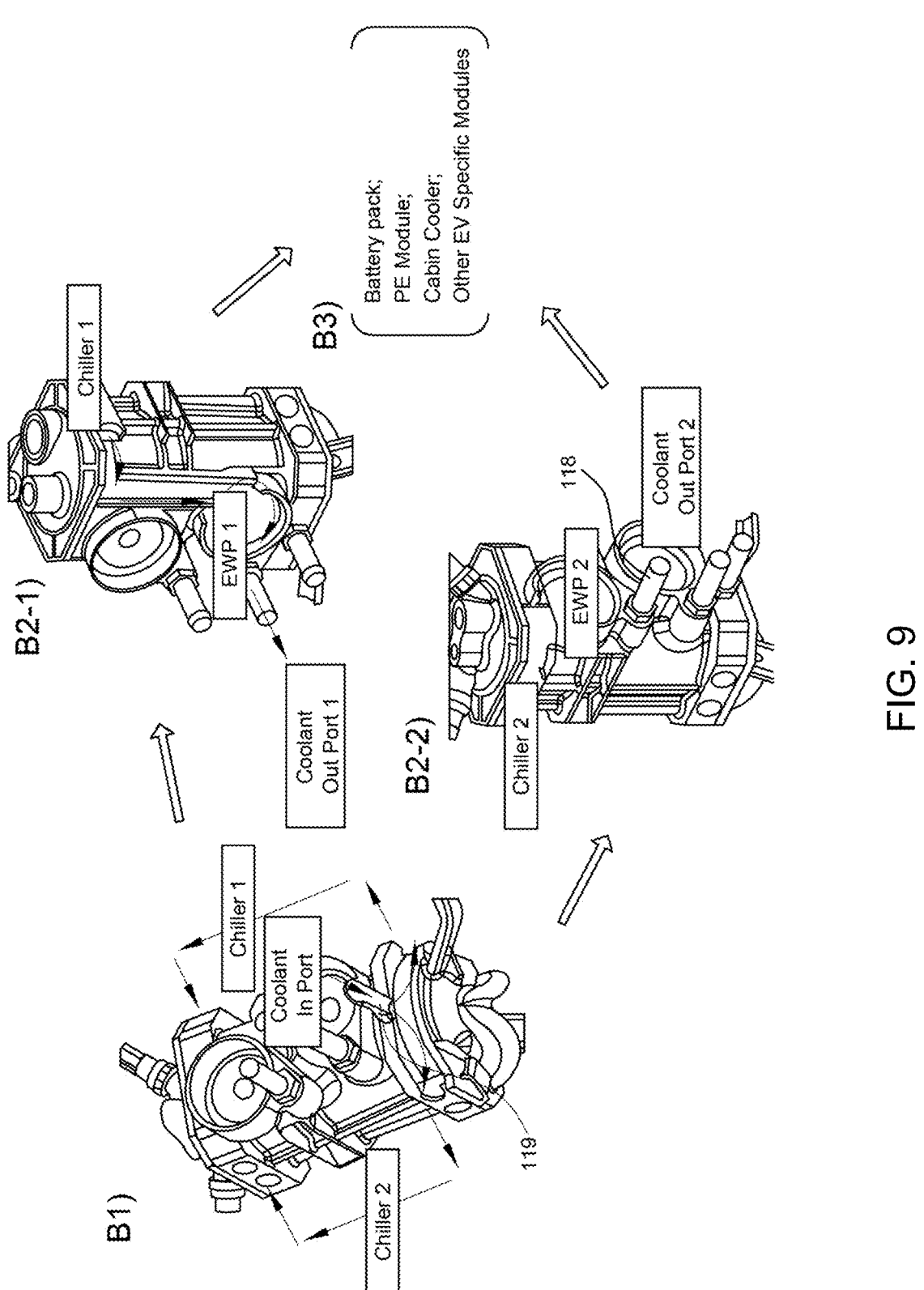
FIG. 9 is a view schematically illustrating the coolant circulation path according to the example of the present invention.

With reference to FIG. 9, the coolant is introduced into the coolant storage part 110 through the first connection port 119 (Coolant INLET) that is the coolant inlet port, and the coolant is introduced into the first and second chillers (Chiller 1 and Chiller 2) (B1). The coolant, which has been introduced into the first chiller (Chiller 1) and performed the heat exchange, is introduced into the first water pump (EWP 1) and then discharged to the outside through the coolant discharge port 118 (Coolant OUTLET 1) (B2-1). Thereafter, the coolant performs the heat exchange while passing through a battery pack, a PE module, a cabin cooler, and the like (B3). Thereafter, the coolant may be introduced into the pump and the like and then introduced back into the integrated cooling module of the present invention. The coolant, which has been introduced into the second chiller (Chiller 2) and performed the heat exchange, is introduced into the second water pump (EWP 2) and then discharged to the outside through the coolant discharge port 118 (Coolant OUTLET 2) (B2-2). Thereafter, the coolant performs the heat exchange while passing through the battery pack, the PE module, the cabin cooler, and the like B3. Thereafter, the coolant may be introduced into the pump and the like and then introduced back into the cooling module of the present invention.

According to the integrated cooling module of the present invention as described above, the constituent elements are intensively integrated with the manifold to constitute the cooling circulation circuit. Therefore, hoses or pipes may be excluded by the integration of the components that constitute the cooling system, thereby achieving miniaturization and weight reduction of the entire cooling system. Further, mounting structures (brackets, bolts, nuts, etc.) for mounting the components in the vehicle may be eliminated, which may reduce the number of components and the number of assembling processes at the time of configuring the cooling system.

In addition, the manifold of the present invention may be elongated in the gravitational direction to advantageously store the coolant therein and more intensively mount the components, thereby reducing the space occupied by the integrated cooling module. Further, the internal heat exchanger may be provided in the manifold, thereby maximizing the spatial efficiency.

While the embodiments of the present invention have been described with reference to the accompanying drawings, those skilled in the art will understand that the present invention may be carried out in any other specific form without changing the technical spirit or an essential feature thereof. Therefore, it should be understood that the above-described embodiments are illustrative in all aspects and do not limit the present invention.

DESCRIPTION OF REFERENCE NUMERALS

10: Integrated cooling module
100: Manifold
110: Coolant storage part
111: Coolant inlet port
112: Coolant inlet port closure
115: First mounting port
118: Coolant discharge port
119: First connection port
120: Refrigerant channel
125: Second mounting port
129: Second connection port
150: Water pump mounting structure
102: Support leg
103-1: First gasket
103-2: Second gasket
200: Component
COND: Condenser
Chiller: Chiller
EXV: Expansion valve
PT Sensor: PT sensor
EWP: Water pump
IHX: Internal heat exchanger

What is claimed is:

1. An integrated cooling module comprising:
a manifold; and
components integrated with and mounted on the manifold to eliminate connecting pipes or hoses and reduce the size and weight of an associated cooling system,
wherein the manifold includes a coolant storage part, wherein the coolant storage part includes a space that is configured to store a coolant,
wherein refrigerant channels, through which a refrigerant flows, are provided around the coolant storage part, and
wherein the manifold has one or more first connection ports configured to allow the coolant storage part to communicate with the outside, and one or more second connection ports configured to allow the refrigerant channel to communicate with the outside.

2. The integrated cooling module of claim 1, wherein the manifold has a structure in which a first manifold, a second manifold, and a third manifold are stacked and coupled to one another, wherein the second manifold is hollowed, and the coolant storage part is positioned in the hollowed second manifold, and wherein the first manifold and the third manifold cover and close the hollowed interior of the second manifold.

3. The integrated cooling module of claim 2, wherein a first gasket is provided between the first and second manifolds and a second gasket is provided between the second and third manifolds.

4. The integrated cooling module of claim 2, wherein the refrigerant channels are formed inside a housing that constitutes the second manifold.

5. The integrated cooling module of claim 4, wherein the refrigerant channel is further formed inside at least one of a housing, which constitutes the first manifold, and a housing that constitutes the second manifold.

6. The integrated cooling module of claim 2, wherein the first manifold has a coolant inlet port formed through the first manifold so that the coolant is introduced into the coolant storage part, and wherein the coolant inlet port includes a coolant inlet port closure, which is configured to close the coolant inlet port.

7. The integrated cooling module of claim 2, wherein the third manifold has one or more support legs extending from one or more sides coupled to the third manifold.

8. The integrated cooling module of claim 1, wherein the manifold is elongated in a first direction.

9. An integrated cooling module comprising:
a manifold; and
components integrated with and mounted on the manifold to eliminate connecting pipes or hoses and reduce the size and weight of an associated cooling system,
wherein the manifold includes a coolant storage part, wherein the coolant storage part includes a space that is configured to store a coolant,
wherein refrigerant channels, through which a refrigerant flows, are provided around the coolant storage part, and
an internal heat exchanger is provided in the manifold and disposed in the coolant storage part.

10. An integrated cooling module comprising:
a manifold; and
components integrated with and mounted on the manifold to eliminate connecting pipes or hoses and reduce the size and weight of an associated cooling system,
wherein the manifold includes a coolant storage part, wherein the coolant storage part includes a space that is configured to store a coolant,
wherein refrigerant channels, through which a refrigerant flows, are provided around the coolant storage part, and
wherein the manifold has first mounting ports configured to allow the coolant storage part and the components to communicate with one another, and second mounting ports configured to allow the refrigerant channels and the components to communicate with one another.

11. The integrated cooling module of claim 10, wherein at least one of the components is fluidly connected to the first mounting port and the second mounting port and configured such that the coolant and the refrigerant flow.

12. The integrated cooling module of claim 10, wherein the components include a condenser, a chiller, a pressure/temperature sensor, an expansion valve, and a water pump.

13. The integrated cooling module of claim 12, wherein the water pump is fluidly connected to the coolant storage part through the first mounting port, wherein the condenser, the pressure/temperature sensor, and the expansion valve are respectively fluidly connected to the refrigerant channels through the second mounting ports, and wherein the chiller is fluidly connected to the coolant storage part and the refrigerant channels through the first mounting port and the second mounting port.

14. The integrated cooling module of claim 12, wherein an additional chiller and an additional water pump are mounted on the manifold.

15. An integrated cooling module comprising:
a manifold; and
components integrated with and mounted on the manifold to eliminate connecting pipes or hoses and reduce the size and weight of an associated cooling system,
wherein the manifold includes a coolant storage part, wherein the coolant storage part includes a space that is configured to store a coolant,
wherein refrigerant channels, through which a refrigerant flows, are provided around the coolant storage part, and
wherein the components include a water pump, and the manifold has a water pump mounting structure provided in the form of a groove that accommodates an end side of the water pump that is coupled to the manifold.

16. An integrated cooling module comprising:
a manifold; and
components integrated with and mounted on the manifold to eliminate connecting pipes or hoses and reduce the size and weight of an associated cooling system,
wherein the manifold includes a coolant storage part, wherein the coolant storage part is configured to store a coolant,
wherein refrigerant channels, through which a refrigerant flows, are provided around the coolant storage part, and
wherein the components include a condenser and a chiller, and the condenser and the chiller are disposed so that length directions of the condenser and the chiller are parallel to a first direction.

* * * * *